US012023917B2

(12) United States Patent
Yanagimachi et al.

(10) Patent No.: US 12,023,917 B2
(45) Date of Patent: Jul. 2, 2024

(54) PRINTING APPARATUS

(71) Applicant: SEIKO EPSON CORPORATION, Tokyo (JP)

(72) Inventors: Daisuke Yanagimachi, Matsumoto (JP); Shin Yokota, Matsumoto (JP); Shoichi Murata, Yamagata-Mura (JP)

(73) Assignee: Seiko Epson Corporation, Tokyo (JP)

(*) Notice: Subject to any disclaimer, the term of this patent is extended or adjusted under 35 U.S.C. 154(b) by 109 days.

(21) Appl. No.: 17/934,788

(22) Filed: Sep. 23, 2022

(65) Prior Publication Data

US 2023/0098048 A1 Mar. 30, 2023

(30) Foreign Application Priority Data

Sep. 27, 2021 (JP) ................................ 2021-156414

(51) Int. Cl.
*B41J 11/70* (2006.01)

(52) U.S. Cl.
CPC .................................... *B41J 11/70* (2013.01)

(58) Field of Classification Search
CPC ....................................................... B41J 11/70
See application file for complete search history.

(56) References Cited

U.S. PATENT DOCUMENTS

2007/0022858 A1* 2/2007 Shirotori ................ B26D 1/085 83/624
2009/0074496 A1 3/2009 Mori et al.
2009/0279935 A1* 11/2009 Kawaguchi ............ B26D 1/085 400/621

FOREIGN PATENT DOCUMENTS

JP 2009-72981 A 4/2009

* cited by examiner

*Primary Examiner* — Justin Seo
(74) *Attorney, Agent, or Firm* — WORKMAN NYDEGGER

(57) ABSTRACT

A printing apparatus includes a case configured to receive roll paper of a rolled recording medium, a cover rotatably attached to the case to be used to open or close the case, a transport section including a transport motor provided to the case and a transport roller provided to the cover, the transport section being configured to pull the recording medium from the roll paper and transport the recording medium along a recording medium path, and a cut section including a first blade and a first blade motor configured to move the first blade provided to the cover and a second blade provided to the case, the cut section being configured to cut the recording medium. The first blade motor includes a first blade motor shaft, and the first blade motor is provided to the cover such that a first extension line extending from the first blade motor shaft and a second extension line extending from at least part of the recording medium path in a width direction of the recording medium intersect each other when the cover is closed.

5 Claims, 9 Drawing Sheets

PRINTING APPARATUS

The present application is based on, and claims priority from JP Application Serial Number 2021-156414, filed Sep. 27, 2021, the disclosure of which is hereby incorporated by reference herein in its entirety.

BACKGROUND

1. Technical Field

The present disclosure relates to a printing apparatus.

2. Related Art

Printing apparatuses that have dead space around a motor for moving a blade for cutting a recording medium, for example, a printing apparatus described in JP-A-2009-72981, are known. Since the printing apparatus described in JP-A-2009-72981 has dead space around a motor for moving a blade for cutting a recording medium, downsizing of the printing apparatus is difficult.

SUMMARY

According to an aspect of the present disclosure, a printing apparatus includes a case configured to receive roll paper, a cover rotatably attached to the case and configured to be opened or closed, a transport section including a transport motor disposed on the case and a transport roller disposed on the cover, the transport section configured to pull a recording medium from the roll paper and transport the recording medium along a recording medium path, and a cut section including a first blade and a first blade motor, disposed on the cover, configured to move the first blade and a second blade disposed on the case, the cut section configured to cut the recording medium. The first blade motor includes a first blade motor shaft, and the first blade motor is disposed on the cover such that a first extension line extending from the first blade motor shaft and a second extension line extending from at least part of the recording medium path in a width direction of the recording medium intersect each other when the cover is closed.

DESCRIPTION OF EXEMPLARY EMBODIMENTS

1. Embodiment

Figure 1:
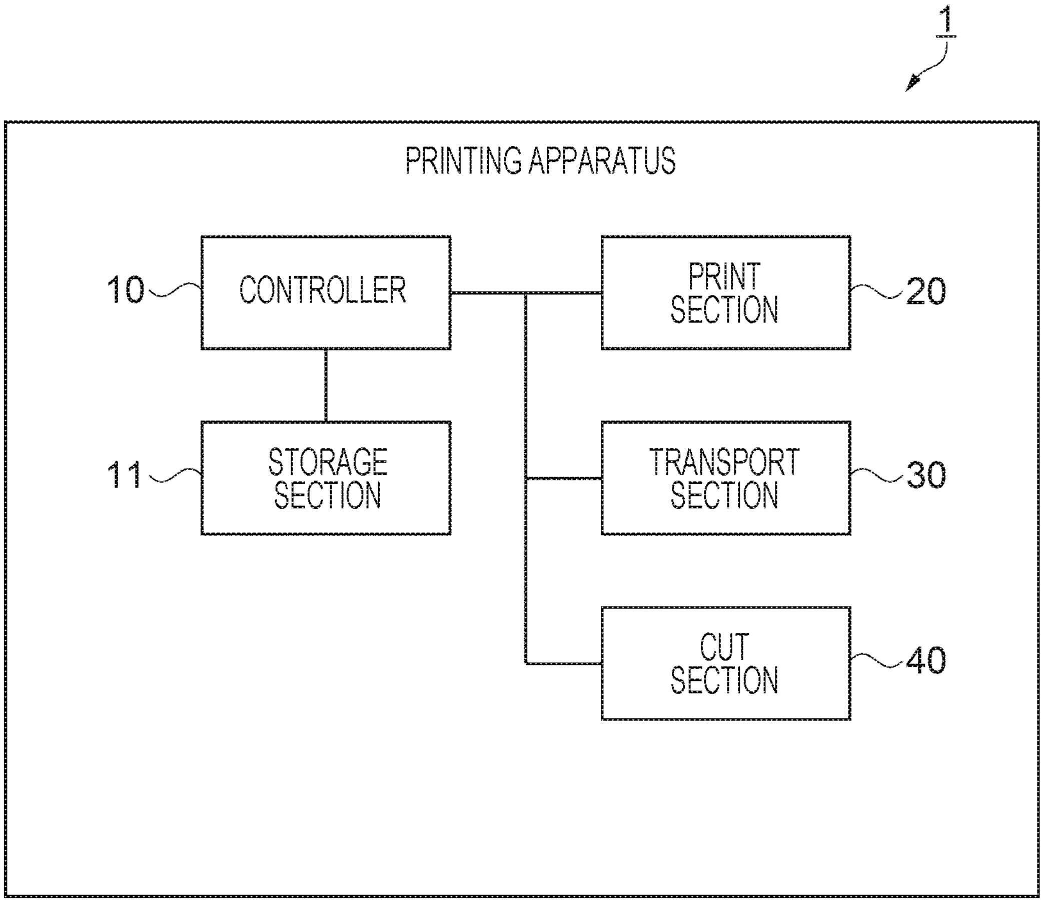
FIG. 1 is a block diagram of a printing apparatus.

Hereinafter, an embodiment will be described with reference to the accompanying drawings. A three-dimensional coordinate system, in which the X-axis, Y-axis, and Z-axis are orthogonal to each other, is used to indicate directions in the drawings. For the sake of simplicity, a positive Z-axis direction denotes upward or simply up, and a negative Z-axis direction denotes downward or simply down; a positive X-axis direction denotes rightward or simply right, and a negative X-axis direction denotes leftward or simply left; and a positive Y-axis direction denotes rearward or simply rear, and a negative Y-axis direction denotes forward or simply front.

A printing apparatus 1 according to the embodiment is used in, for example, point-of-sale (POS) systems. POS systems are used in operations in the retail businesses, such as shopping centers, department stores, convenience stores, and in-vehicle sales, and in the food service businesses, such as restaurants, coffee shops, and bars. POS systems have functions such as a function for processing payments for goods and services purchased by customers and a function of issuing receipts for the payments. When a salesclerk in the retail businesses or food service businesses issues a receipt for purchase, the salesclerk operates a POS system to transmit print data from a computer to the printing apparatus 1. The printing apparatus 1 issues a receipt in accordance with the print data, and the salesclerk hands the receipt to the customer. The printing apparatus 1 is installed on a counter in the shop where payment processing is performed. Such an installation site on the counter is limited, and thus a smaller printing apparatus 1 has been demanded.

1-1. Structure of Printing Apparatus

As illustrated in FIG. 1, the image processing apparatus 1 includes a controller 10, a storage section 11, a print section 20, a transport section 30, and a cut section 40. A structure of the printing apparatus 1 is described with reference to FIG. 2 to FIG. 7.

Figure 2:
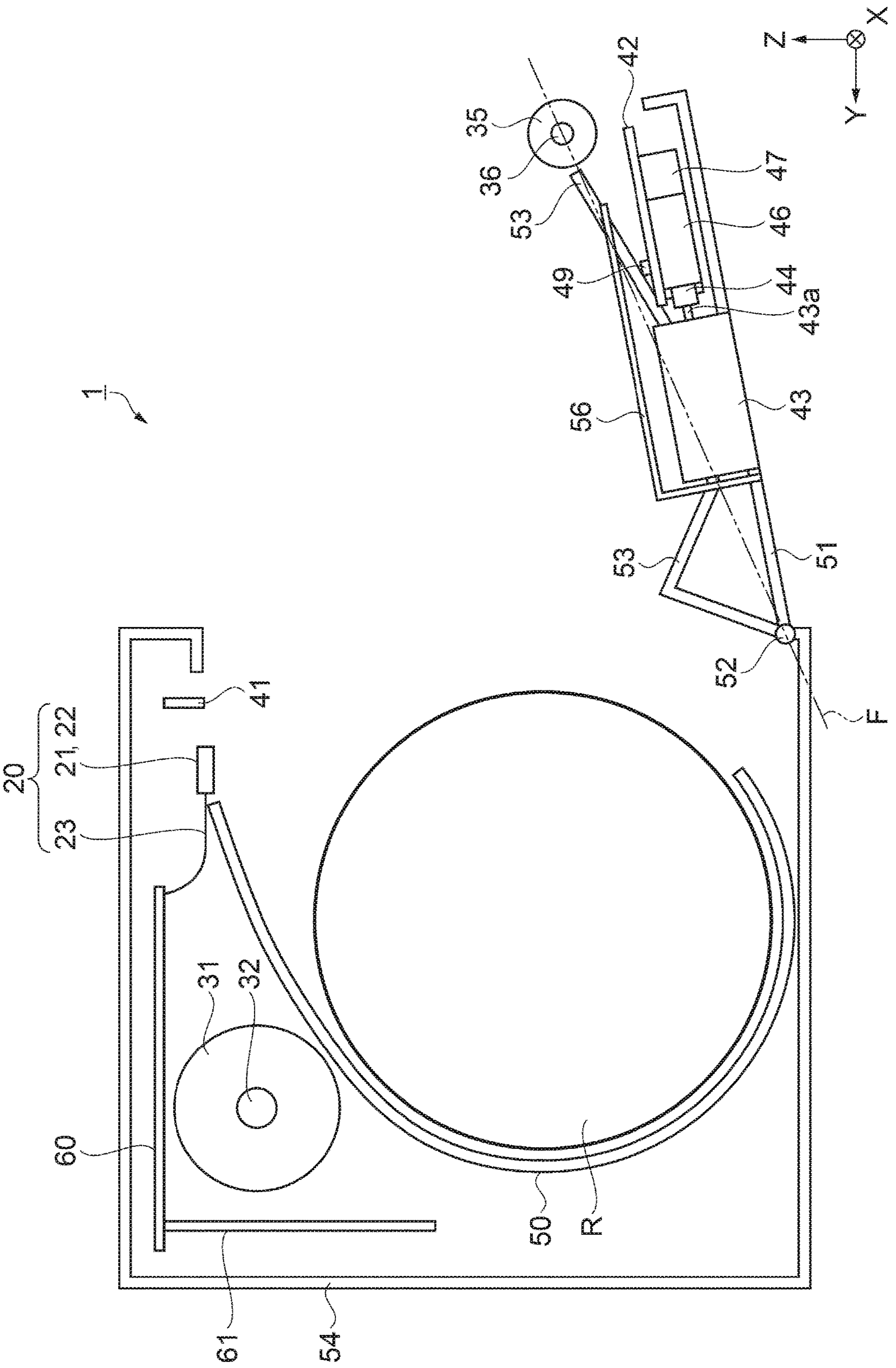
FIG. 2 is a cross-sectional view of a printing apparatus in a state in which a cover is open.

As illustrated in FIG. 2, a cover 51 is attached to a case 54 such that the cover 51 is rotatable about a hinge 52. A housing section 50 in the case 54 receives roll paper R of a rolled recording medium M. The cover 51 is rotated to be switched between a state in which the housing section 50 is open and a state in which the housing section 50 of the case 54 is closed.

Figure 3:
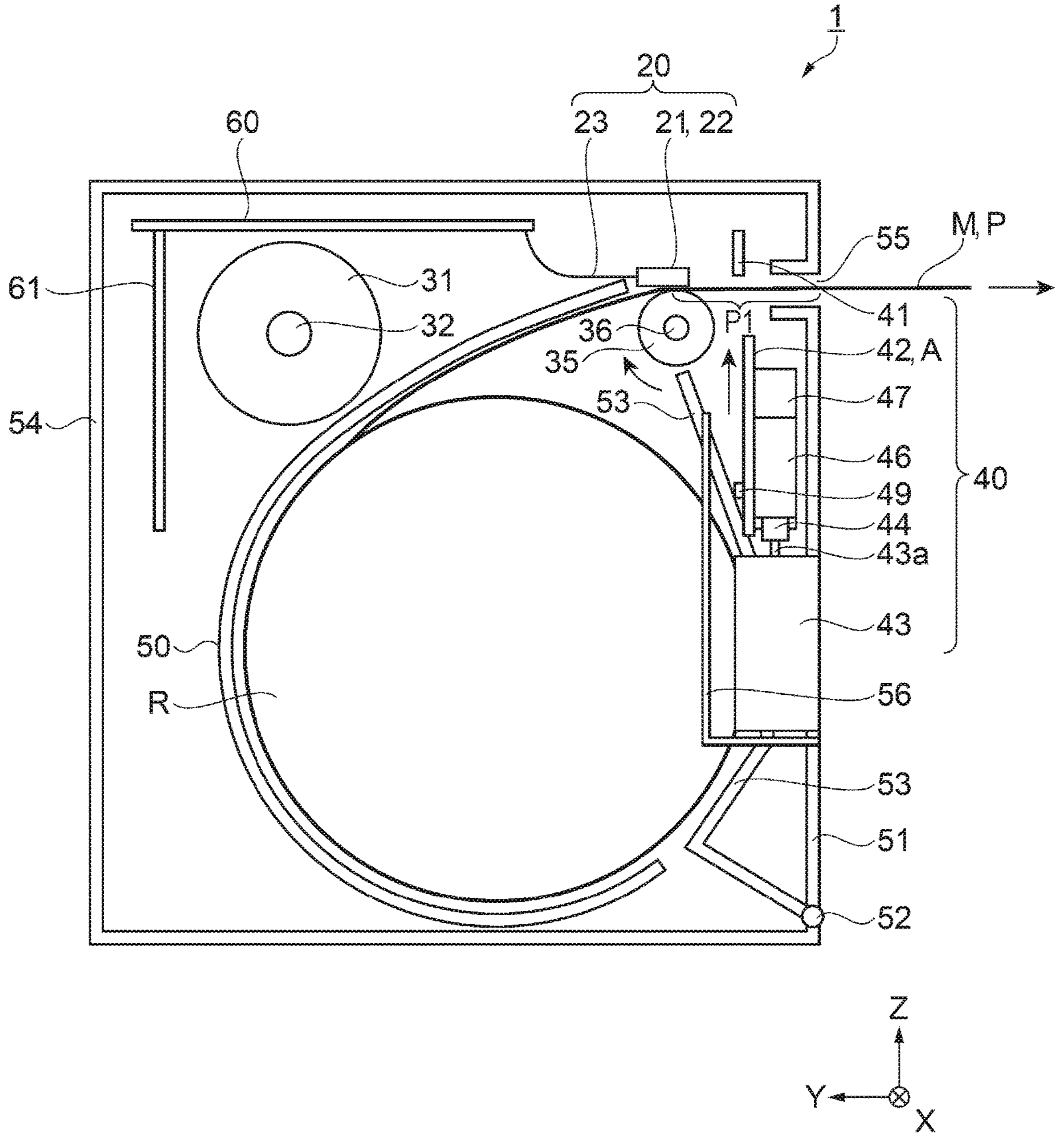
FIG. 3 is a cross-sectional view of a printing apparatus in a state in which a cover is closed and a first blade is in a standby position.

FIG. 2 illustrates a state in which the housing section 50 of the case 54 is opened by using the cover 51. In the description below, opening the housing section 50 of the case 54 by using the cover 51 may be also referred to as "the cover 51 is open". FIG. 3 illustrates a state in which the housing section 50 of the case 54 is closed by using the cover 51. In the description below, closing the housing section 50 of the case 54 by using the cover 51 may be also referred to as "the cover 51 is closed".

First, components provided to the cover 51 are described. As illustrated in FIG. 2, to the cover 51, a transport roller 35 in the transport section 30, a movable blade 42 that is a first blade in the cut section 40, and a guide 53 that is capable of regulating roll paper R as will be described below are provided. A transport roller shaft 36 and a transport roller gear 37 are attached to the transport roller 35.

Figure 5:
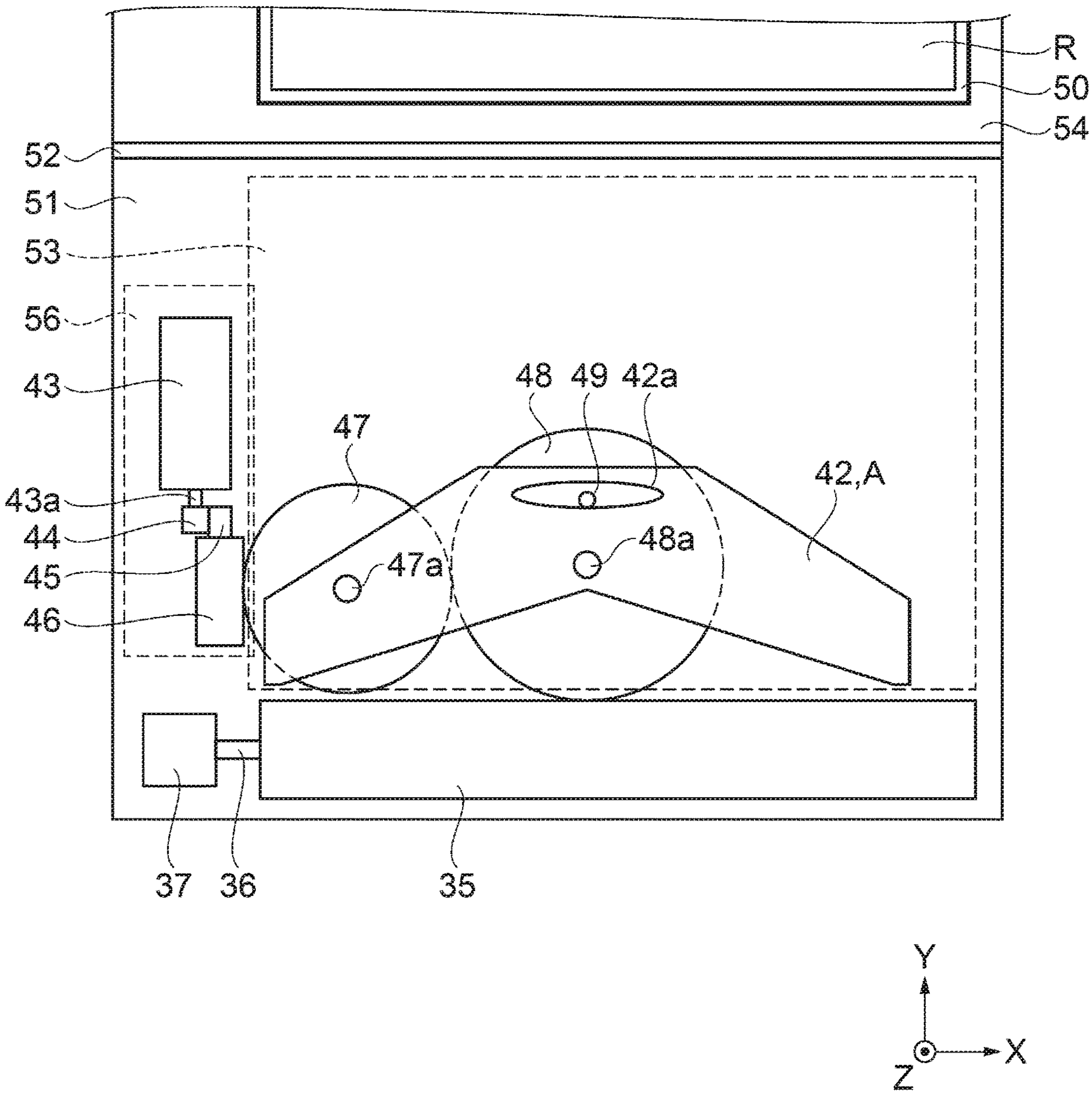
FIG. 5 is a schematic view of components provided to a cover with the cover being open.

Components included in the cut section 40 provided to the cover 51 are described in detail also with reference to FIG. 5. As illustrated in FIG. 5, to the cover 51, in addition to the movable blade 42, a movable blade motor 43, which is a first blade motor, a movable blade motor shaft 43*a*, which is a first blade motor shaft, a movable blade motor gear 44, a transmission gear 45, a worm 46, a worm wheel 47, a gear 48, and a pin 49 mounted on the gear 48, which are included in a moving mechanism for moving the movable blade 42, are provided.

As illustrated in FIG. 2 and FIG. 5, a motor cover 56 that is a first blade motor cover for covering at least part of the movable blade motor 43 in the cut section 40 is provided on the cover 51. The motor cover 56 prevents a salesclerk from touching the movable blade motor 43 when the salesclerk opens the cover 51 and mounts roll paper R on the housing section 50 in the case 54. This structure suppresses failures in the cut section 40 caused by salesclerks by, for example, touching and moving the movable blade motor 43 from occurring. At least part of the movable blade motor 43 close to the movable blade motor gear 44 for transmitting torque may be covered by the motor cover 56. With this structure, failures due to improper transmission of torque from the cut section 40 can be suppressed from occurring.

The motor cover 56 may cover part of the moving mechanism in the cut section 40. For example, the motor cover 56 may cover the movable blade motor shaft 43*a*, the movable blade motor gear 44, the transmission gear 45, and the worm 46. With this structure, failures in the cut section 40 caused by, for example, salesclerks by touching and moving the components can be suppressed from occurring. The worm wheel 47 and the gear 48, which are the components of the moving mechanism in the cut section 40, are covered by the guide 53 such that salesclerks cannot touch the components.

As illustrated in FIG. 2, the movable blade motor 43 is mounted on the cover 51 such that straight line F that is a third extension line extending through the hinge 52, which is the center of rotation of the cover 51, and the transport roller shaft 36 of the transport roller 35 overlaps at least part of the movable blade motor 43. At least part of the movable blade motor 43 may be at least part of a chassis that covers the movable blade motor 43. In such a case, straight line F extends through at least part of the chassis covering the movable blade motor 43.

The chassis of the movable blade motor 43 has a screw hole on the movable blade motor gear 44 side. A first fixing plate and a second fixing plate are fixed to the cover 51. The movable blade motor gear 44 side of the movable blade motor 43 is supported by the cover 51 with a screw fastened into the screw hole through the first fixing plate. The other side of the movable blade motor 43 opposite to the movable blade motor gear 44 side is supported by the cover 51 such that the movable blade motor 43 is held by the second fixing plate. The first fixing plate and the second fixing plate may be formed as a single component or may be formed as a single component integrated with the motor cover 56.

The guide 53 provided to the cover 51 has an arc shape to fit the shape of the roll paper R as will be described below. This shape tends to be dead space, which has limited use, in a space surrounded by the cover 51 and straight line F, which is a space on the right and left sides of the arc-shaped guide 53. The locations of the hinge 52 and the transport roller shaft 36 correspond to the locations of respective ends of the arc shape of the guide 53. The movable blade motor 43 mounted on the cover 51 as described above reduces the dead space surrounded by the cover 51 and straight line F, and thereby the compact printing apparatus 1 can be provided.

Figure 6:
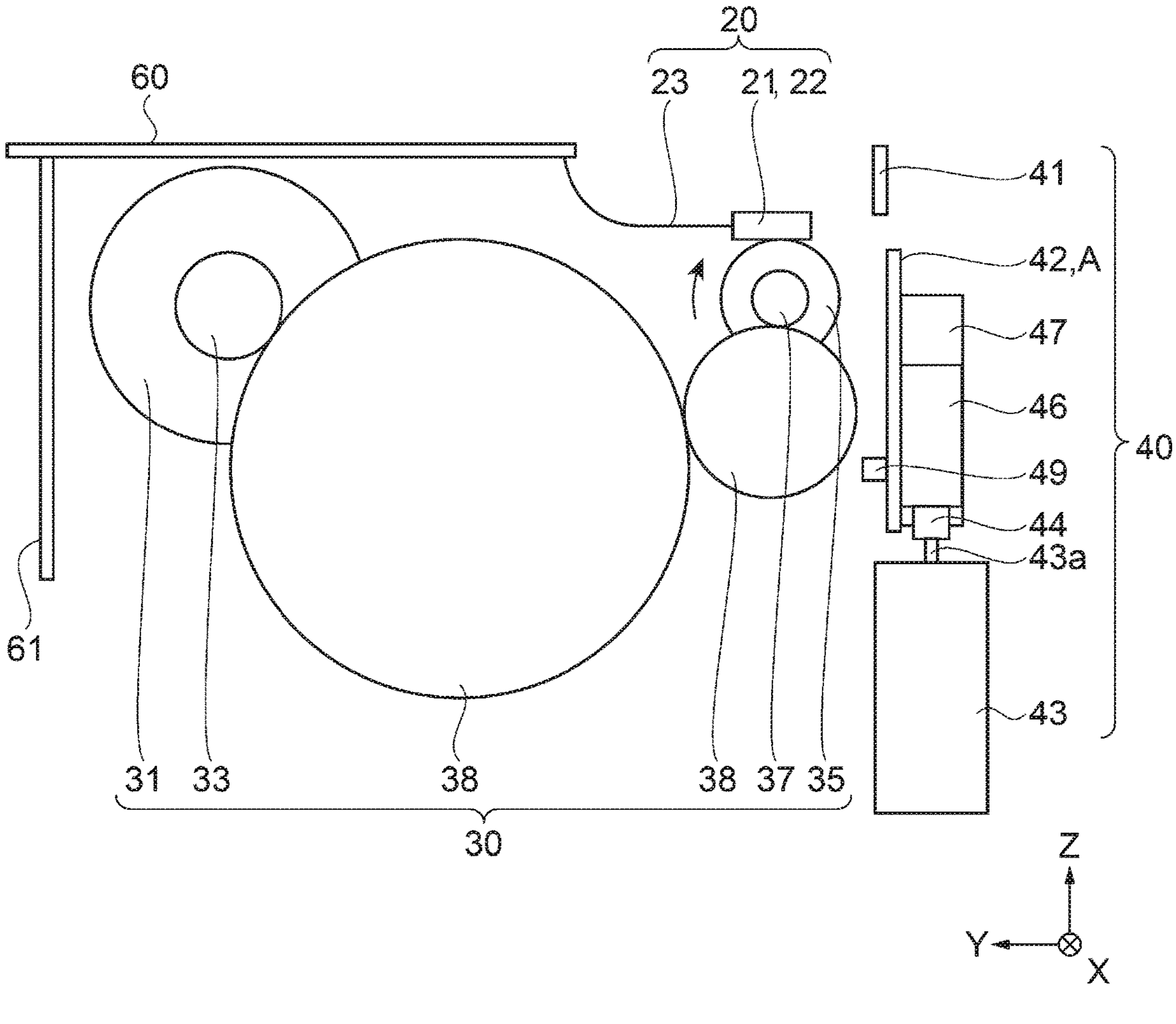
FIG. 6 is a schematic view illustrating a positional relationship between a cut section and a transport section in a state in which a cover is closed.
Figure 7:
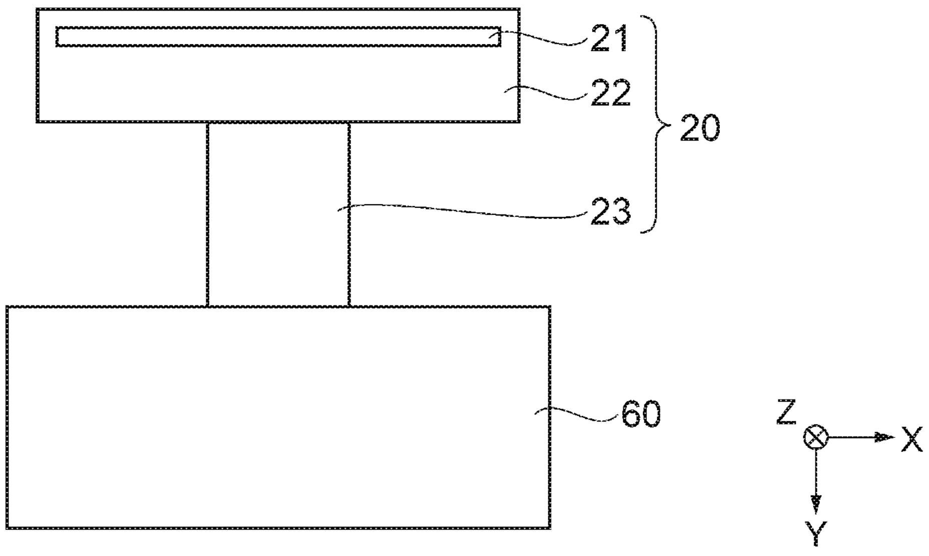
FIG. 7 is a schematic view of a print section.

Next, components provided to the case 54 are described. As illustrated in FIG. 2, a stationary blade 41, which is a second blade in the cut section 40, the print section 20 including a head 21, a transport motor 31 in the transport section 30, and the housing section 50 are disposed in the case 54. As illustrated in FIG. 7, the print section 20 includes the head 21, a head substrate 22, and a flexible flat cable (FFC) 23. As illustrated in FIG. 6, the transport section 30 includes the transport motor 31, a gear train 38, and the transport roller 35.

The case 54 is provided with a main board 60, which is a first board, and a sub board 61, which is a second board. The controller 10, which will be described below, for controlling the print section 20 is mounted on the main board 60. The FFC 23 in the print section 20 is coupled to the main board 60. A communication circuit having relatively large connectors and a power supply circuit are mounted on the sub board 61. These connectors are exposed from the case 54 to the outside. The main board 60 and the sub board 61 are coupled to each other by an internal connector. The internal connector couples the boards, for example, in a vertical orientation. Such an internal connector enables the main board 60 and the sub board 61 to be mounted in an intersecting manner.

FIG. 3 illustrates the cover 51 that is in a closed state. In this state, the transport roller 35 in the transport section 30 provided to the cover 51 faces the head 21 in the print section 20 provided to the case 54. With this structure, a recording medium M is pinched by the head 21 and the transport roller 35. Accordingly, when the cover 51 is closed, the head 21 in the print section 20 faces the transport roller 35 so as to come into contact with the recording medium M, and thereby printing can be performed.

In addition, when the cover 51 is closed, the gear train 38 meshes with the transport roller gear 37 for the transport roller 35, enabling the transport motor 31 to transmit torque to the transport roller 35 as described below. Accordingly, when the cover 51 is closed, the transport roller 35 can transport the recording medium M. As described above, in response to a salesclerk opening the cover 51, disposing roll paper R in the housing section 50, and closing the cover 51, the printing apparatus 1 is ready for printing on the recording medium M.

In the printing apparatus 1 in FIG. 3, the cover 51 is mounted on the front of the printing apparatus 1; however, the printing apparatus 1 may be mounted such that the cover 51 is on the top of the printing apparatus 1. Such a printing apparatus 1 forms a discharge slot 55 with the cover 51 in the front or the top of the printing apparatus 1, enabling salesclerks to readily take a printed recording medium M discharged from the discharge slot 55.

As illustrated in FIG. 3, when the cover 51 is closed, the movable blade 42 of the cut section 40 provided to the cover 51 faces the stationary blade 41 provided to the case 54, and the movable blade 42 and the stationary blade 41 can slide against each other. As illustrated in FIG. 3, a position at which the movable blade 42 is away from the stationary blade 41 is referred to as a standby position A. When the cover 51 is closed, the discharge slot 55 for discharging a recording medium M is formed between the cover 51 and the case 54. More specifically, when the cover 51 is in the closed state, the rectangular discharge slot 55 is formed between an end of the cover 51 on the side opposite to the hinge 52 and the case 54 that faces the end of the cover 51.

In addition, a recording medium path P is formed when the cover 51 is closed. The recording medium path P is formed from upstream to downstream in the direction of transporting a recording medium M such that the recording medium M is regulated by the housing section 50, the head 21, the transport roller 35, and the discharge slot 55. The recording medium M is pulled from the roll paper R by the transport section 30 and is transported along the recording medium path P. A part of the recording medium path P from the head 21 to the discharge slot 55 is specifically referred to as a part P1. In other words, the part P1 is at least part of the recording medium path P including the part from the position of the head 21 in the print section 20 and the transport roller 35 in the transport section 30, which face each other, to the position of the discharge slot 55.

The print section 20 may further include a pressing mechanism for pressing the head 21 against the transport roller 35. The recording medium M is pinched by the pressing mechanism with a predetermined pressing force between the head 21 and the transport roller 35. The transport roller 35 rotated clockwise by the transport motor 31 transports the recording medium M pinched by the head 21 and the transport roller 35 with the predetermined pressing force. The transport roller 35 is made of a flexible material, such as silicone rubber. Accordingly, the transport roller 35 can pinch the recording medium M together with the head 21 with the predetermined pressing force and generate a frictional force for transporting the recording medium M.

When the recording medium M is pulled from the roll paper R by the transport section 30, the roll paper R may roll in the front-rear direction. The guide 53 provided to the cover 51 has an arc shape to fit the shape of the roll paper R, similarly to the housing section 50, and the roll paper R is regulated in the front-rear direction by the housing section 50 and the guide 53 so as not to rotate.

The head 21 in the print section 20 is, for example, a line thermal head that has a plurality of heating elements linearly arranged. The recording medium M is thermal paper. The recording medium M comes into contact with the head 21 and develops color with the heat generated by the heating element, and thereby printing is performed in accordance with print data. The head 21, which is the line thermal head, performs printing on the recording medium M while the recording medium M is transported by the transport roller 35. The printed recording medium M is discharged from the discharge slot 55.

Figure 4:
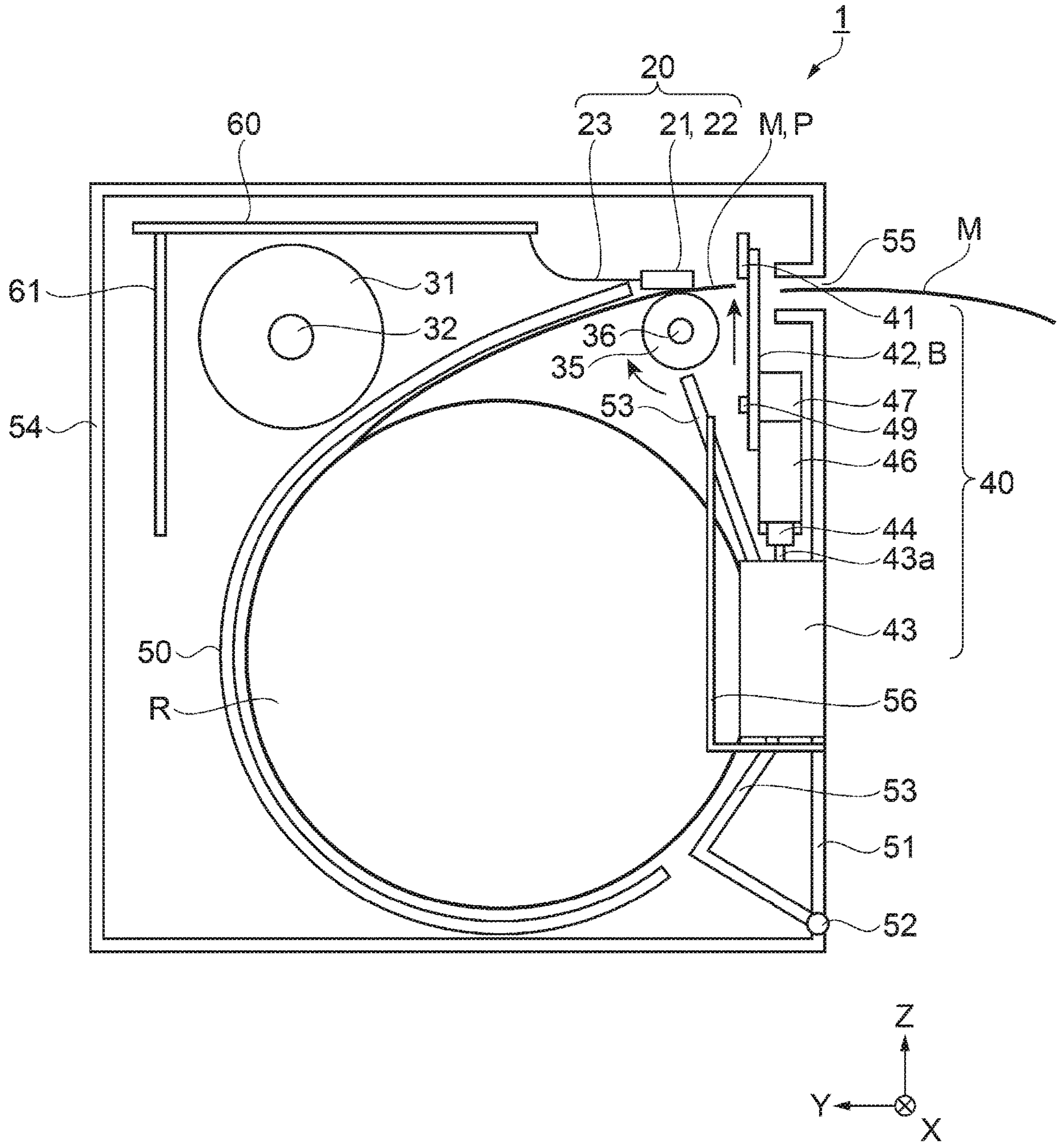
FIG. 4 is a cross-sectional view of the printing apparatus in a state in which a cover is closed and a first blade is in a cut position.

In the cut section 40, the movable blade 42 is moved from a standby position A illustrated in FIG. 3 toward a cut position B illustrated in FIG. 4 by the above-described moving mechanism including the movable blade motor 43. More specifically, the movable blade 42 is moved toward the stationary blade 41 to cut a recording medium M that is within the part P1 in the recording medium path P and between the movable blade 42 and the stationary blade 41.

The controller 10 illustrated in FIG. 1 includes a central processing unit (CPU) that performs overall control of the components in the printing apparatus 1, a universal asynchronous receiver transmitter (UART) that manages input and output, and a field programmable gate array (FPGA) and a programmable logic device (PLD), which are logic circuits. The CPU is also referred to as a processor. The storage section 11 may include a flash read-only memory (ROM), which is rewritable nonvolatile memory, a hard disk drive (HDD), and random access memory (RAM), which is volatile memory. The CPU in the controller 10 reads a program, such as firmware, stored in nonvolatile memory in the storage section 11 and executes the program by using the RAM in the storage section 11 as a work area.

As illustrated in FIG. 7, the print section 20 includes the head 21, the head substrate 22, and the FFC 23. More specifically, the head 21 is mounted on the head substrate 22 made of, for example, a ceramic. The head 21 and the main board 60 are coupled by a cable, such as the FFC 23. In response to the controller 10 on the main board 60 receiving print data from a computer, the controller 10 generates a control signal for controlling the head 21 and applies the control signal to the head 21 via the FFC 23. The head 21 prints a receipt in accordance with the applied control signal on the recording medium M.

1-2. Layout of Transport Section and Cut Section

A layout of the transport section 30 and the cut section 40 is described in detail with reference to FIG. 5 and FIG. 6. As illustrated in FIG. 6, in the case 54, the gear train 38 is mounted on a side to which a transport motor gear 33 for the transport motor 31 is attached. The gear train 38 meshes with the transport motor gear 33 to transmit torque of the transport motor 31 to the transport roller 35. The gear train 38 is a combination of gears and transmits torque to the transport roller 35 while reducing the rotation speed of the transport motor 31.

As illustrated in FIG. 5, the transport roller gear 37 for the transport roller 35 is disposed in the left of the cover 51. When the cover 51 is closed, the gear train 38 provided to the case 54 meshes with the transport roller gear 37 mounted on the cover 51 to rotate the transport roller 35 clockwise. As illustrated in FIG. 6, the transport motor gear 33 for the transport motor 31, the gear train 38, and the transport roller gear 37 for the transport roller 35 in the transport section 30 are each efficiently disposed in a left space in the printing apparatus 1.

As illustrated in FIG. 5, the movable blade motor 43, the movable blade motor shaft 43*a*, the movable blade motor gear 44, the transmission gear 45, and the worm 46 in the cut section 40 are each efficiently disposed in a space to the left of the guide 53 in the cover 51. The transport roller gear 37 for the transport roller 35 is also disposed in the space. As described above, the components of the cut section 40, such as the movable blade motor 43, are provided to the cover 51 on the side where the gear train 38 is mounted with respect to the transport motor 31.

As illustrated in FIG. 5, the lateral dimensions of the housing section 50, the guide 53, and the transport roller 35, which house, regulate, and transport the roll paper R and the recording medium M, respectively, are wider than the roll paper R and the recording medium M, and the components take up a lot of space in the printing apparatus 1. The components of the transport section 30 and the cut section 40 are efficiently disposed in the space in the printing apparatus 1 while interference with the transport roller 35, the guide 53, the housing section 50, and other components is avoided as described above, even when the cover 51 is closed. With this structure, the compact printing apparatus 1 can be provided.

The movable blade motor 43 in the cut section 40 is a relatively large component. The movable blade motor 43 efficiently disposed in, for example, the left space in the printing apparatus 1, which tends to be a dead space, reduces the dead space in the printing apparatus 1, and thereby the compact printing apparatus 1 can be provided. In addition, at least the movable blade motor gear 44, the transmission gear 45, and the worm 46 in the cut section 40 and at least the transport motor gear 33, the gear train 38, and the transport roller gear 37 for the transport gear 35 in the transport section 30 efficiently disposed in the left space in the printing apparatus 1 further reduce the dead space in the printing apparatus 1, and thereby the compact printing apparatus 1 can be further provided.

1-3. Operation in Cut Section

Figure 8:
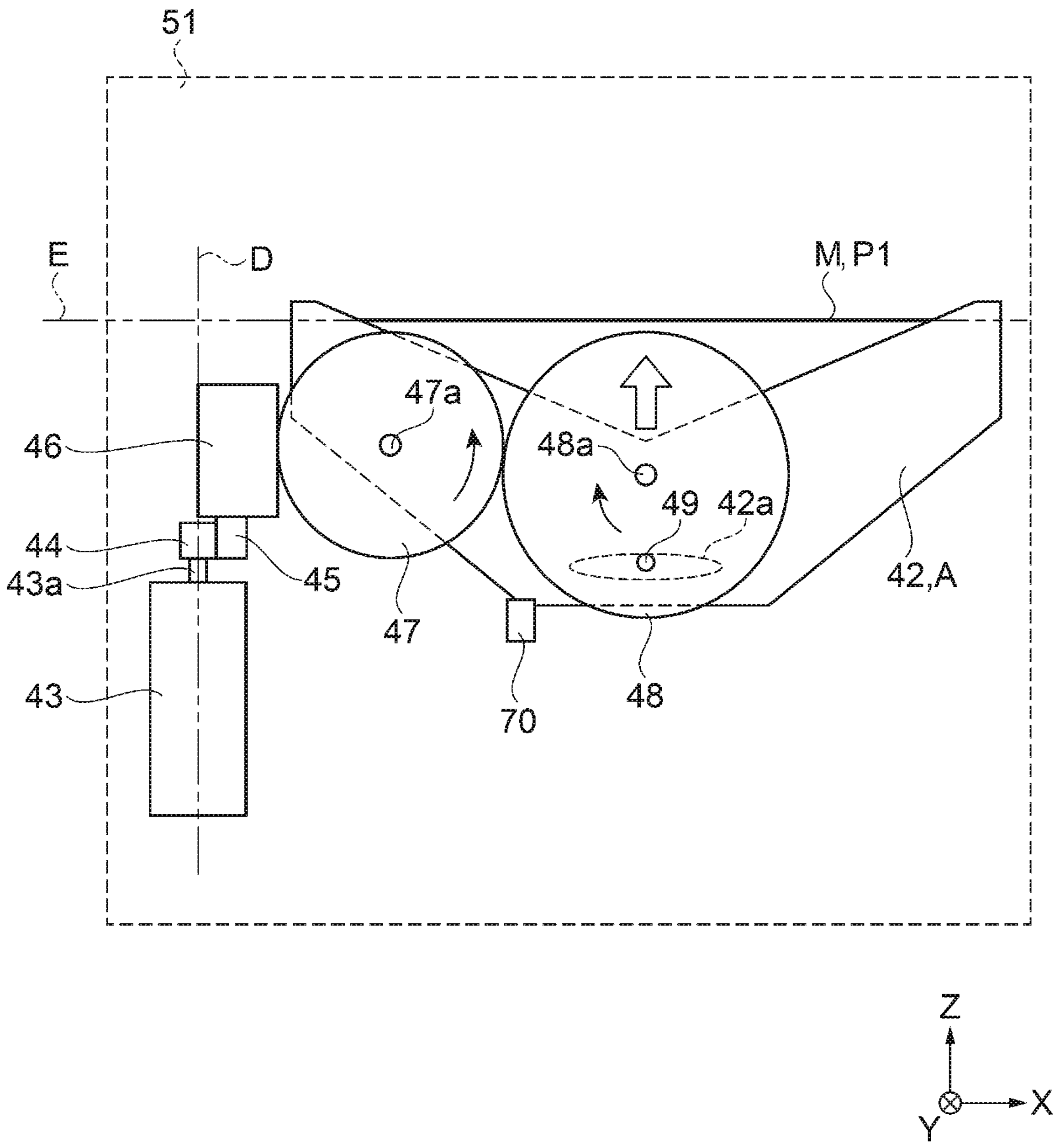
FIG. 8 is a schematic view illustrating a positional relationship with respect to a recording medium path in a state in which a first blade is in a standby position.
Figure 9:
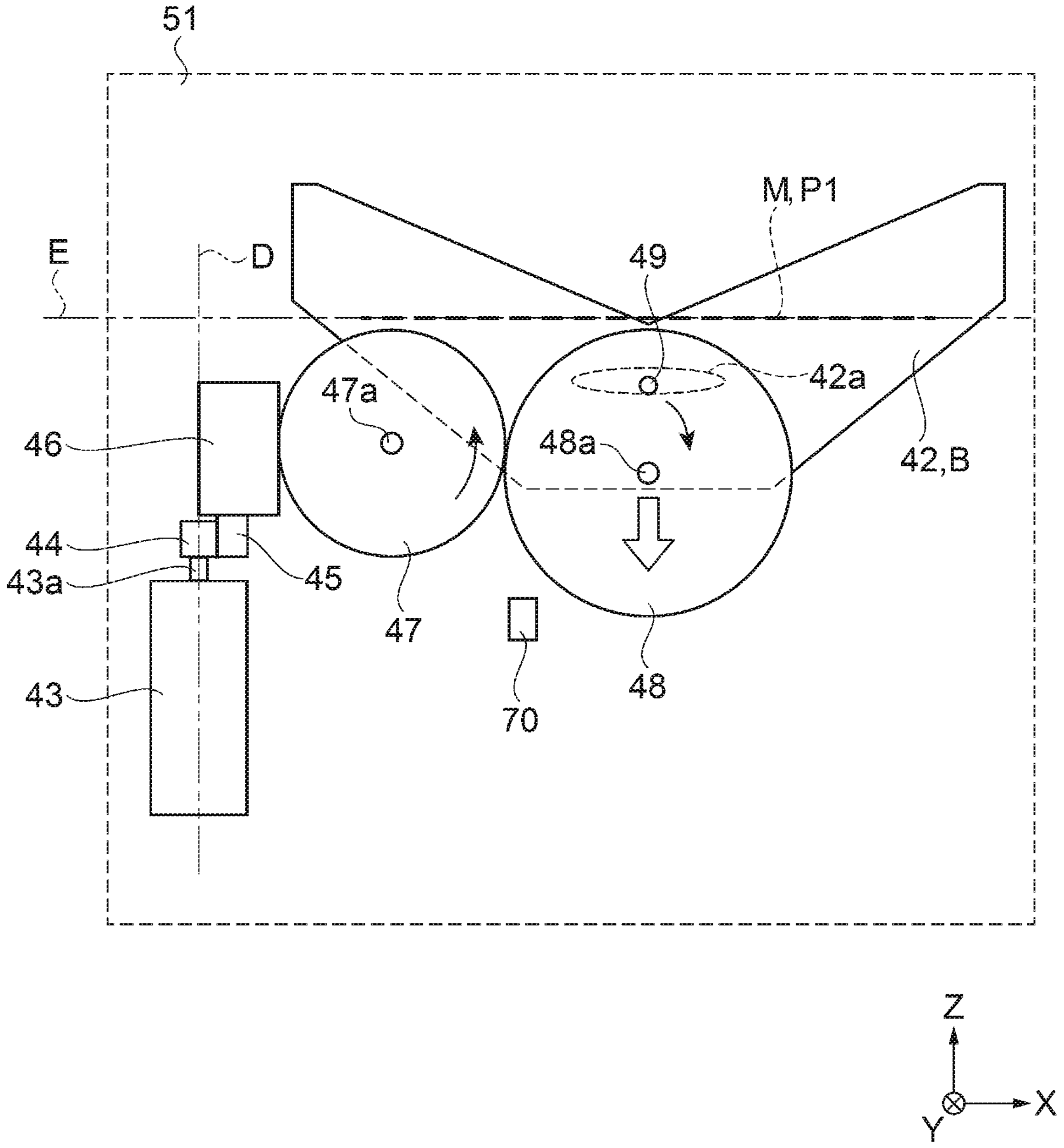
FIG. 9 is a schematic view illustrating a positional relationship with respect to a recording medium path in a state in which a first blade is in a cut position.

The operation of the cut section 40 is described in detail with reference to FIG. 8 and FIG. 9. FIG. 8 and FIG. 9 illustrate the cover 51 in a closed state and omit the stationary blade 41. First, as illustrated in FIG. 8, it is assumed that the movable blade 42 is in the standby position A. The movable blade 42 in the standby position A is retracted with respect to the part P1 in the recording medium path P.

In cutting the recording medium M with the movable blade 42, the movable blade motor 43 is started under control of the controller 10. The movable blade motor shaft 43*a* rotates in response to the movable blade motor 43 starting and rotates the movable blade motor gear 44 attached to the movable blade motor shaft 43*a*. The movable blade motor gear 44 meshes with the transmission gear 45, which is coaxial with the worm 46. In response to the movable blade motor gear 44 rotating, the worm 46 rotates via the transmission gear 45. By the rotation, the worm wheel 47 meshing with the worm 46 is rotated counterclockwise around a worm wheel shaft 47*a*. The worm 46 serves as a worm gear together with the worm wheel 47.

The pin 49 is provided to the gear 48 such that the pin 49 protrudes from the gear 48. The movable blade 42 has an elongated hole 42*a* that has a laterally elongated elliptical shape. In the description below, an edge of an upper portion of the elongated elliptical hole 42*a* is referred to as an upper edge, and an edge of a lower portion of the elongated elliptical hole 42*a* is referred to as a lower edge. The pin 49 on the gear 48 is slidably fit into the elongated hole 42*a* of the movable blade 42. As illustrated in FIG. 8, when the pin 49 on the gear 48 is in the lowest position, the movable blade 42 is in the standby position A.

In response to the worm wheel 47 rotating counterclockwise, the gear 48 meshing with the worm wheel 47 rotates clockwise around a gear shaft 48*a*. The pin 49 rotates clockwise with the gear 48 rotating clockwise while sliding along the upper edge of the elongated hole 42*a* to press the movable blade 42 upward. As a result, the movable blade 42 is moved to the cut position B as illustrated in FIG. 9. While the movable blade 42 is moved from the standby position A toward the cut position B, the movable blade 42 proceeds upward and passes the part P1 of the recording medium path P, thereby cutting the recording medium M in the part P1 of the recording medium path P.

The movable blade 42 is made of a V-shaped metal piece and has a cutting edge at the top of the V shape. The V-shaped cutting edge of the movable blade 42 moves toward the stationary blade 41, that is, performs cutting-off processing. The movable blade 42 cuts the recording medium M from both ends of the recording medium M with the V-shaped cutting edge while moving. Fully cutting the recording medium M across the width with the movable blade 42 is referred to as full cutting.

The movable blade 42 can perform partial cutting under control of the controller 10, that is, the movable blade 42 is moved and stopped at a position at which only the central portion of the V shape of the movable blade 42 does not cut the recording medium M such that a central portion of the recording medium M remains uncut. In such a case, a detector may be provided to detect the position at which partial cutting is performed by the movable blade 42. In response to the detector detecting the movable blade 42 reaching the position at which partial cutting is performed, the controller 10 stops driving the movable blade motor 43 to stop the movable blade 42 at the position of partial cutting.

When the movable blade 42 reaches the cut position B, the cutting processing on the recording medium M is terminated. As illustrated in FIG. 9, when the pin 49 on the gear 48 is in the highest position, the movable blade 42 is in the cut position B. Next, the controller 10 moves the movable blade 42 toward the standby position A. The movable blade motor 43 is further driven and the movable blade motor shaft 43*a* is further rotated under control of the controller 10, and the worm wheel 47 is further rotated counterclockwise via the movable blade motor gear 44, the transmission gear 45, and the worm 46.

The pin 49 rotates clockwise with the gear 48 rotating clockwise while sliding along the lower edge of the elongated hole 42*a* to press the movable blade 42 downward. The movable blade 42 is retracted downward with respect to the part P1 of the recording medium path P to the standby position A. As illustrated in FIG. 8, when the pin 49 of the gear 48 is returned to the lowest position and the movable blade 42 is retracted downward with respect to the part P1 to the standby position A, the movable blade 42 is detected by a detector 70. In response to the detector 70 detecting that the movable blade 42 has reached the standby position A, the controller 10 stops driving the movable blade motor 43.

When partial cutting is performed, the movable blade motor 43 may be reversed under control of the controller 10. The movable blade 42 is not moved further from the position of partial cutting and can be returned to the standby position A in a state in which the central portion of the recording medium M remains. The gear 48 and the pin 49 rotate counterclockwise in response to the movable blade motor 43 reversing, and the pin 49 presses the movable blade 42 downward while sliding along the lower edge of the elongated hole 42*a*, and thereby the movable blade 42 can be moved to the standby position A.

It should be noted that the movable blade 42 may have a groove elongated in the direction in which the movable blade 42 is moved, which is the up-down direction, in a central portion in the lateral direction. Another pin provided to the cover 51 may be fitted into the groove. The groove of the movable blade 42 is moved along the pin, and thus the movable blade 42 is not moved laterally. As a result, the movable blade 42 proceeds straight and returns straight with respect to the part P1 of the recording medium path P. Accordingly, the movable blade 42 can precisely cut the recording medium M.

When the movable blade motor 43 is driven, in a case in which the controller 10 has not detected by using the detector 70 within a predetermined time that the movable blade 42 is moved from the standby position A to the cut position B and returned to the standby position A, the controller 10 determines that an error has occurred. For example, when the recording medium M is stuck in the part P1 of the recording medium path P and the movable blade 42 cannot be moved, the controller 10 determines that an error has occurred. In such a case, the controller 10 stops driving the movable blade motor 43 and notifies the user that an error has occurred in the cut section 40 by using a notification device, such as a liquid crystal display device or a speaker.

1-4. Layout of Cut Section and Recording Medium Path

The layout of the cut section 40 and the recording medium path P is described in detail with reference to FIG. 8 and FIG. 9. In FIG. 8, the movable blade 42 in the cut section 40 is in the standby position A where the movable blade 42 is retracted with respect to the part P1, which is at least part of the recording medium path P, as described above. The recording medium M transported by the transport section 30 and printed by the print section 20 is on the part P1 and can be cut by the movable blade 42. In FIG. 9, the movable blade 42 proceeds to the part P1 and is in the cut position B where the recording medium M has been cut.

FIG. 8 and FIG. 9 illustrate straight line E that is a second extension line extending from at least part of the part P1 of the recording medium path P in a left direction, which is one of the width directions of the recording medium. FIG. 8 and FIG. 9 also illustrate straight line D that is a first extension line extending from the movable blade motor shaft 43*a* of the movable blade motor 43. As illustrated in FIG. 8 and FIG. 9, the movable blade motor 43 is mounted on the cover 51 such that straight line D and straight line E intersect each other when the cover 51 is closed.

As described above, the left space in the printing apparatus 1 tends to be dead space. In other words, the space in the printing apparatus 1 on the left of the part P1 of the recording medium path P also tends to be dead space. The movable blade motor 43 has a cylindrical shape elongated around the movable blade motor shaft 43*a* in a direction of the movable blade motor shaft 43*a*.

The movable blade motor 43 is mounted on the cover 51 such that straight line D, which passes through the movable blade motor shaft 43*a* of the cylindrical movable blade motor 43, intersects straight line E in the dead space in the printing apparatus 1 on the left of at least part of the part P1 at a position straight line E passes through when the cover 51 is closed. With this structure, the cylindrical movable blade motor 43 can be efficiently mounted on the cover 51 while interference with the part P1 of the recording medium path P is avoided and the dead space in the printing apparatus 1 is reduced, and thereby the compact printing apparatus 1 can be provided.

In addition, the movable blade motor 43 mounted on the cover 51 such that straight line D and straight line E intersect each other enables the rotation shafts of the movable blade motor gear 44, the transmission gear 45, and the worm 46, each of which is the center of rotation, in the cut section 40 to be mounted parallel to straight line D on the cover 51. In other words, in addition to the movable blade motor shaft 43*a* of the movable blade motor 43, these components can be mounted such that the directions of the rotation shafts of the components are aligned. With this structure, the components of the cut section 40 can be efficiently provided to the cover 51 while the dead space in the printing apparatus 1 is reduced, and thereby the compact printing apparatus 1 can be further provided.

According to the embodiment described above, the movable blade motor 43 in the cut section 40 is mounted on the cover 51 such that straight line D and straight line E intersect each other when the cover 51 is closed. This structure reduces the dead space around the movable blade motor 43 that is an empty space in the printing apparatus 1 where other components are not disposed, and thereby the compact printing apparatus 1 can be provided.

While the embodiment has been described in detail with reference to the drawings, it is to be understood that the specific structures are not limited to these structures according to the embodiment, and some structures may be modified, replaced, or omitted without departing from the scope of the disclosure.

The head 21 in the printing apparatus 1 described above is the line thermal head; however, the head 21 of any type may be used. For example, the head 21 may be a line ink jet head. The example recording medium M described above is thermal paper. When the head 21 is an ink jet head, plain paper may be used. The recording medium M may be a label sheet, which consists of a liner and standard-size labels attached to the liner. The printing apparatus 1 may be a label printing apparatus installed in shops. In such a case, a photo sensor for detecting the positions of labels attached to a liner may be disposed at a position upstream of the part P1 of the recording medium path P in the transport direction of the recording medium M. For example, when the photo sensor is a reflective photo sensor, a light emitter and a light receiver may be mounted on the guide 53 of the cover 51 or the housing section 50 corresponding to the position. In another case, when the photo sensor is a transmissive photo sensor, a light emitter and a light receiver may be mounted on the guide 53 of the cover 51 and the housing section 50 respectively.

The movable blade 42 may be a metal piece of a rectangular parallelepiped and have a cutting edge at one of the sides. In such a case, the movable blade 42 is a scissor-type movable blade that is rotatably supported around a support shaft provided to the cover 51. The movable blade 42 is rotated around the support shaft by the movable blade motor 43 to be moved with respect to the stationary blade 41 from one end of the cutting edge of the movable blade 42 toward the other end to come into contact with the stationary blade 41 to cut the recording medium M. The movable blade motor 43 may be a DC motor or a step motor, or a motor of another type. The movable blade motor 43 having the cylindrical shape has been described; however, a motor of another shape may be used. The movable blade may have any shape as long as the movable blade can be disposed in the dead space in the left in the printing apparatus 1. The gear train 38 that consists of a plurality of gears has been described as an example component for transmitting torque of the transport motor 31 to the transport roller 35; however, the torque may be transmitted by a belt. The detector 70 for detecting a position of the movable blade 42 may be a mechanical switch or an optical photo sensor. A locking mechanism that can hold the cover 51 in a closed state may be provided in the left space in the case 54. This mechanism enables a reduction of the dead space in the left space in the printing apparatus 1, increasing the space efficiency.

What is claimed is:

1. A printing apparatus comprising:

a case configured to receive roll paper;

a cover rotatably attached to the case and configured to be opened or closed;

a transport section including a transport motor disposed on the case and a transport roller disposed on the cover, the transport section configured to pull a recording medium from the roll paper and transport the recording medium along a recording medium path; and a cut section including a first blade and a first blade motor, disposed on the cover, configured to move the first blade, and a second blade disposed on the case, the cut section configured to cut the recording medium, wherein the first blade motor includes a first blade motor shaft, and the first blade motor is disposed on the cover such that a first extension line extending from the first blade motor shaft and a second extension line extending from at least part of the recording medium path in a width direction of the recording medium intersect each other when the cover is closed.

2. The printing apparatus according to claim 1, wherein the transport roller includes a transport roller shaft, and the first blade motor is disposed on the cover such that a third extension line extending through the transport roller shaft and a center of rotation of the cover passes at least part of the first blade motor.

3. The printing apparatus according to claim 1, further comprising:

a print section configured to perform printing on the recording medium at a position facing the transport roller when the cover is closed, wherein when the cover is closed, a discharge slot for discharging the recording medium is formed between the cover and the case, and at least part of the recording medium path is at least part of the recording medium path from the position of the transport roller and the print section that face each other to the position of the discharge slot.

4. The printing apparatus according to claim 1, further comprising:

a gear train configured to transmit torque of the transport motor to the transport roller, wherein the first blade motor is mounted on a side of the cover to which the gear train is disposed with respect to the transport motor.

5. The printing apparatus according to claim 1, wherein a first blade motor cover for covering at least part of the first blade motor is disposed on the cover.

* * * * *